US011893442B1

(12) United States Patent
Yee et al.

(10) Patent No.: US 11,893,442 B1
(45) Date of Patent: Feb. 6, 2024

(54) TRANSACTION CARD INCLUDING REMOVABLE INSERT

(71) Applicant: Capital One Services, LLC, McLean, VA (US)

(72) Inventors: Bryant Yee, Silver Spring, MD (US); Tyler Maiman, Melville, NY (US); Ashley Dakota Ross, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 14 days.

(21) Appl. No.: 17/864,951

(22) Filed: Jul. 14, 2022

(51) Int. Cl.
*G06K 19/077* (2006.01)
*G06K 19/06* (2006.01)

(52) U.S. Cl.
CPC . *G06K 19/07737* (2013.01); *G06K 19/06187* (2013.01)

(58) Field of Classification Search
CPC ....... G06K 19/07737; G06K 19/06187; G06K 1/125; G06K 13/063; G06K 19/06196; G06K 7/087; B42D 25/369
See application file for complete search history.

(56) References Cited

U.S. PATENT DOCUMENTS

| 3,650,210 | A | * | 3/1972 | Archer | B42D 25/00 101/369 |
| 6,481,125 | B1 | * | 11/2002 | Pokrasoff | B42D 15/027 229/92.8 |
| 2005/0194453 | A1 | * | 9/2005 | Conner | G06K 19/044 235/492 |
| 2007/0022647 | A1 | * | 2/2007 | Miller | B32B 27/08 40/654.01 |
| 2008/0196288 | A1 | * | 8/2008 | Turner | G09F 1/02 40/600 |
| 2013/0161390 | A1 | * | 6/2013 | Rodriquez | G06K 19/07743 29/829 |
| 2017/0267012 | A1 | * | 9/2017 | Krieman | G09F 27/00 |
| 2020/0394370 | A1 | * | 12/2020 | Garrett | G06K 19/07737 |

FOREIGN PATENT DOCUMENTS

KR 20100056692 * 11/2008

OTHER PUBLICATIONS

Gerald Madlmayr, "Management of Multiple Secure Elements in NFC-Devices" (Year: 2008).*
Hojo et al., "Magnetic_Shielding_Effectiveness_and_Application_of_0.003_Carbon_Steel_Foil" (Year: 1989).*

* cited by examiner

Primary Examiner — Thien T Mai
(74) Attorney, Agent, or Firm — KDW Firm PLLC (57) ABSTRACT

Provided are approaches for customizing transaction cards using a replaceable insert. In some approaches, the transaction card may include a body comprising a first main side opposite a second main side, a first end opposite a second end, and a first side opposite a second side, wherein a chip is coupled to the first main side of the body. An insert may be positioned within a recess along the first main side, wherein a first magnetic material of the recess and a second magnetic material of the insert are positioned proximate one another to increase retention between the insert and the body.

20 Claims, 7 Drawing Sheets

TRANSACTION CARD INCLUDING REMOVABLE INSERT

FIELD

Embodiments of the present disclosure relate to transaction cards and, more particularly, to transaction cards including a removable insert.

BACKGROUND

Transaction cards, such as credit cards and debit cards, typically contain account information such as the account number, owner's name, expiration date, etc. This information may be provided in different formats, and at different positions along the card. Transaction cards may also include one or more aesthetic features, which may be selected to increase brand or product recognition, and/or user appeal. Typically, the design cannot be customized or personalized once the card is constructed, however.

It is with respect to this and other considerations that the present improvements are provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a transaction card may include a body comprising a first main side opposite a second main side, a first end opposite a second end, and a first side opposite a second side, wherein a chip is coupled to the first main side of the body. The transaction card may further include an insert positioned within a recess along the first main side, wherein a first magnetic material of the recess and a second magnetic material of the insert are positioned proximate one another to increase retention between the insert and the body.

In another approach according to the disclosure, a transaction card may include a body comprising an outer perimeter and a first main side opposite a second main side, wherein a chip is coupled to the first main side of the body. The transaction card may further include an insert formed within a recess along the first main side, wherein the insert extends to the outer perimeter, and wherein a first magnetic material of the recess and a second magnetic material of the insert are positioned proximate one another to increase retention between the insert and the first main side of the body.

In yet another approach according to the disclosure, a transaction card may include a body comprising a first main side opposite a second main side, a first end opposite a second end, and a first side opposite a second side, wherein an identification (ID) chip is coupled to the first main side, and wherein a recess is formed in the first main side. The transaction card may further include an insert positioned within the recess, wherein a plane defined by a top surface of the insert is coplanar with a plane defined by a top surface of the first main side, and wherein a first magnetic material of the recess and a second magnetic material of the insert are positioned proximate one another to increase engagement between the insert and the first main side of the body.

BRIEF DESCRIPTION OF THE DRAWINGS

The accompanying drawings illustrate example approaches of the disclosure, including the practical application of the principles thereof, as follows.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to transaction cards including an identification (ID) chip, such as an EMV chip, and a replaceable insert. In some embodiments, the replaceable insert is positioned within a recess along a front of the transaction card and held in place by magnetic attraction to increase retention between the insert and the body of the card. In some embodiments, magnetic material may be positioned along both the recess of the card and the insert. In other embodiments, magnetic material may be placed along either the body or the insert. The insert may be decoupled from the body of the transaction card and replaced with another insert, as desired, either by a vendor or an end user.

Figure 1:
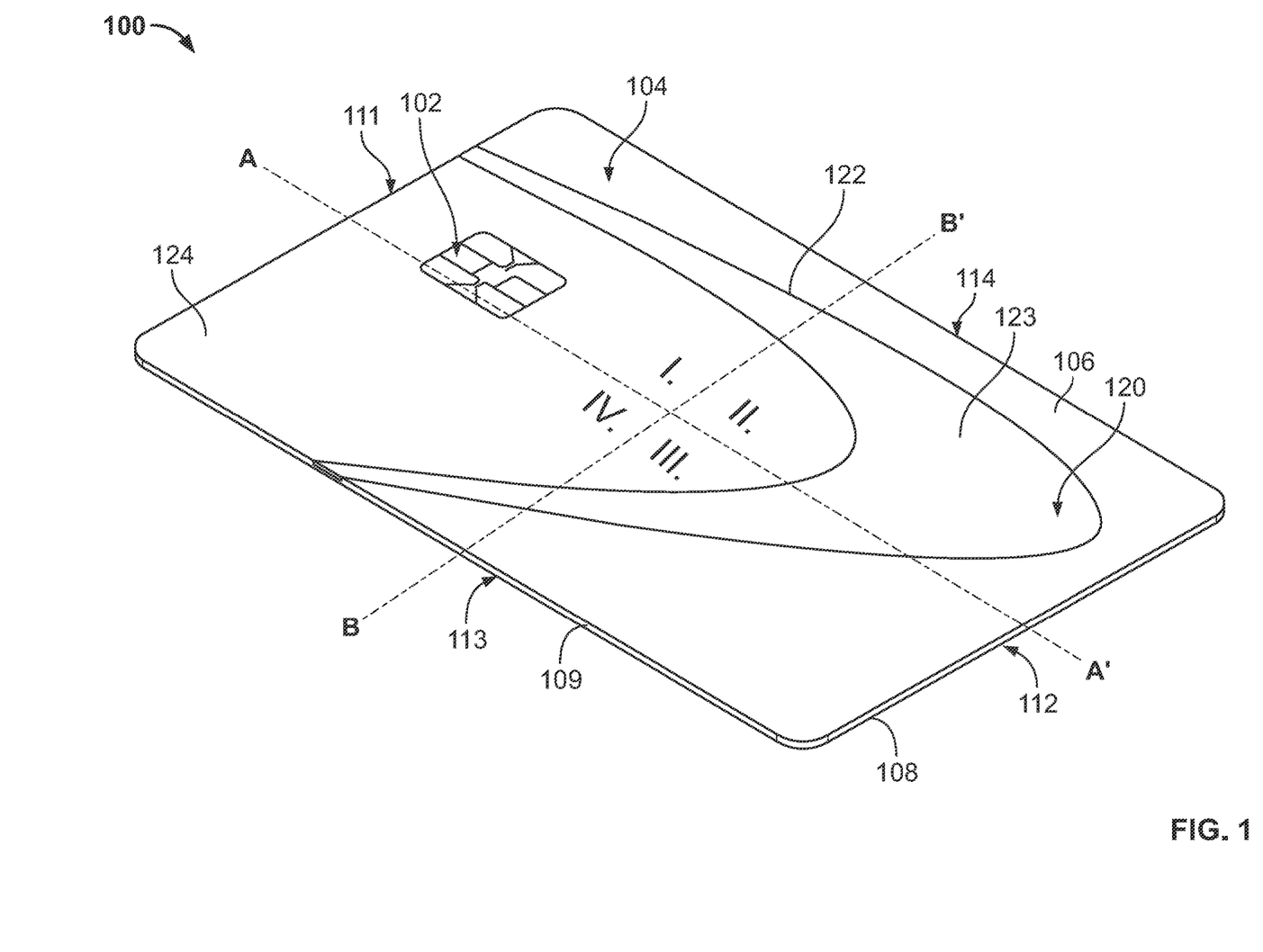
FIG. 1 is a perspective view illustrating a transaction card, in accordance with embodiments of the present disclosure.

Referring now to FIG. 1, an example transaction card (hereinafter "card") 100 according to embodiments of the disclosure will be described. The card 100 may be a credit or debit card, a RFID passport, or an access card. As will be described in greater detail herein, the card 100 may include multiple layers each having one or more functions. Although non-limiting, the card 100 may be made from polyvinyl chloride (PVC), polyester, polycarbonate, or metal (e.g., a pure metal or metal alloy). Described sometimes herein as contactless due to the method of communication by an identification chip 102 (hereinafter "chip"), such as an EMV chip or RFID chip, the card 100 may also provide one or more functions requiring contact. For example, the card 100 may include a magnetic stripe (not shown) and/or a microchip connected to contacts present on an outer layer of the card 100.

The card 100 may include a body 104 having a first main side 106 opposite a second main side 108. Although non-limiting, the first main side 106 may correspond to a front or top side of the card 100, while the second main side 108 may correspond to a back or bottom side of the card 100. The first main side 106 and the second main side are joined by a side surface 109 extending around a perimeter of the body 104. The body 104 may further include a first end 111 opposite a second end 112, and a first side 113 opposite a second side 114. A first axis A-A' may extend between the first end 111 and the second end 112 of the body 104, and a second axis B-B' may extend between the first side 113 and the second side 114. As shown, the first axis and the second axis may generally extend perpendicular to one another, defining quadrants I-IV of the body 104.

As used herein, the chip 102 may be any microprocessor device configured to exchange data electromagnetically. RFID chips may include a radio frequency inductor, volatile or non-volatile memory storage, a microprocessor, circuitry logic, and/or an antenna. While in some embodiments electromagnetic data communications from RFID chips will take place at radio frequencies, other embodiments may exchange electromagnetic data at different frequencies. Although non-limiting, the chip 102 may be recessed into the first main side 106 of the body 104.

Although not shown, the card 100 may also include a magnetic stripe provided on the second main side 108 of the body 104. In some embodiments, the magnetic stripe is part of an exterior layer along the second main side 108. In other embodiments, the magnetic stripe is disposed atop or beneath the exterior layer. The magnetic stripe may contain cardholder data in accordance with standard protocols.

The card 100 may further include an insert 120 along the first main side 106 and/or the second main side 108 of the body 104. In the embodiment shown, the insert 120 may be positioned within a recess 122 along the first main side 106 of the card 100. Although non-limiting, the insert 120 may be a logo or other stylized design. A plane defined by an upper surface 123 of the insert 120 may generally be co-planar with a plane defined by an upper surface 124 of the first main side 106. Although not limited to any specific shape or configuration, the insert 120 may extend to both the first end 111 and to the first side 113 of the body 104. Said another way, the insert 120 may extend across the first axis and the second axis, and may be partially located within each of quadrants I-IV.

In some embodiments, the body 104 and the insert 120 may be the same material. In other embodiments, the body 104 and the insert 120 may be different materials. For example, the body 104 may be made from PVC while the insert 120 may be made from metal, fabric, natural or synthetic hair, wood, polyester, polycarbonate, or a combination of materials.

Figure 2A:
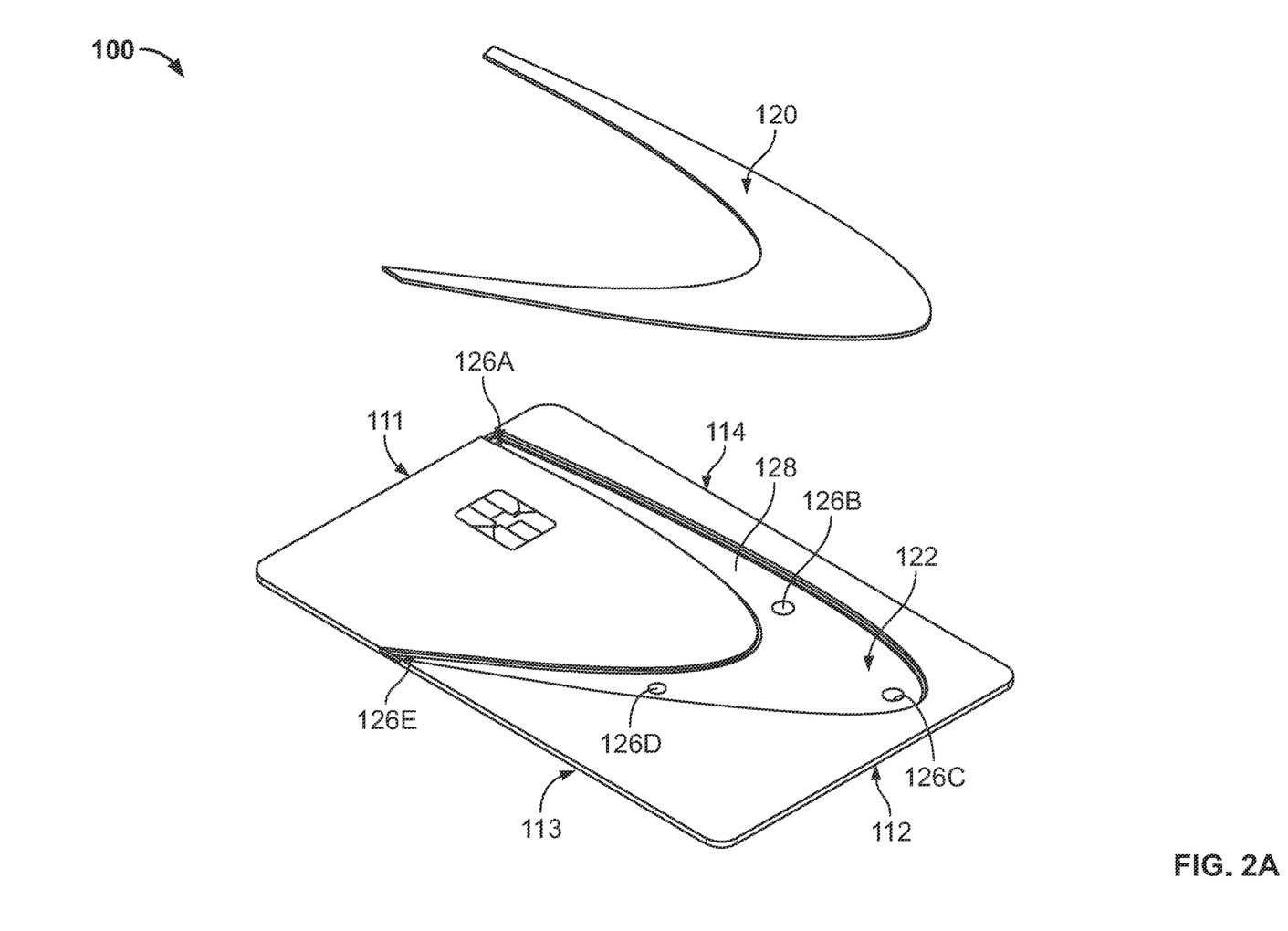
FIG. 2A is an exploded perspective view of the transaction card and an insert, in accordance with embodiments of the present disclosure.

As shown in FIG. 2A, the insert 120 may be held in place by a magnetic material along the recess 122 and/or the insert 120. For example, the recess 122 may include a first plurality of magnets 126A-126E spaced apart from one another within the recess 122. Although non-limiting, magnet 126A may be positioned proximate the first end 111, magnet 126C may be positioned proximate the second end 112, and magnet 126E may be positioned proximate the first side 113. It will be appreciated that a greater or lesser number of magnets may be present within the recess 122 in other embodiments.

In some embodiments, the first plurality of magnets 126A-126E may be positioned atop, or extend through, an upper surface 128 of the recess 122. In other embodiments, the first plurality of magnets 126A-126E may be embedded beneath the upper surface 128 of the recess 122. Alternatively, the upper surface 128 of the recess 122 may be composed entirely of a layer of magnetic material. In still other embodiments, an insulating layer (not shown) may be positioned between the first plurality of magnets 126A-126E and the second main side 108 of the body 104 to prevent possible interference with the magnetic stripe along the second main side 108.

Figure 2B:
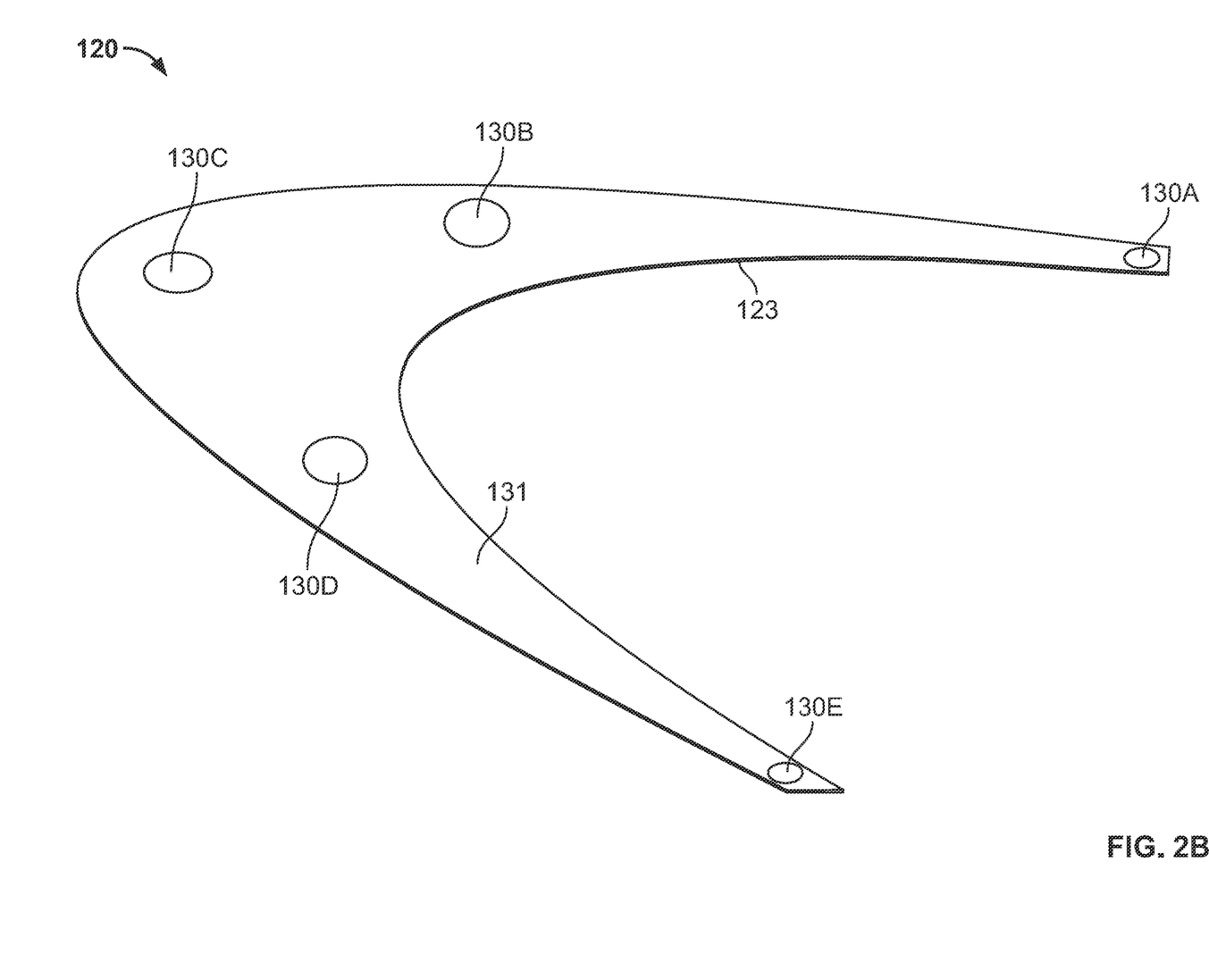
FIG. 2B is a perspective view of the insert, in accordance with embodiments of the present disclosure.

As shown in FIG. 2B, the insert 120 may include a second plurality of magnets 130A-130E, which may be positioned along a lower surface 131 of the insert 120 for engagement with the first plurality of magnets 126A-126E. The second plurality of magnets 130A-130E may be positioned atop, or extend through, the lower surface 131 of the insert 120. In other embodiments, the second plurality of magnets 130A-130E may be embedded between the upper surface 123 and the lower surface 131 of the insert 120. In still other embodiments, the lower surface 131, or the entire insert 120, may be made from a magnetic material, such as a ferromagnetic metal. During use, the insert 120 may held in position within the recess 122 (FIG. 2A) by the attraction between the first plurality of magnets 126A-126E and the second plurality of magnets 130A-130E. Advantageously, the insert 120 may be removed and replaced with an alternative insert, which may have a different color, design, material, etc., as desired.

Figure 3:
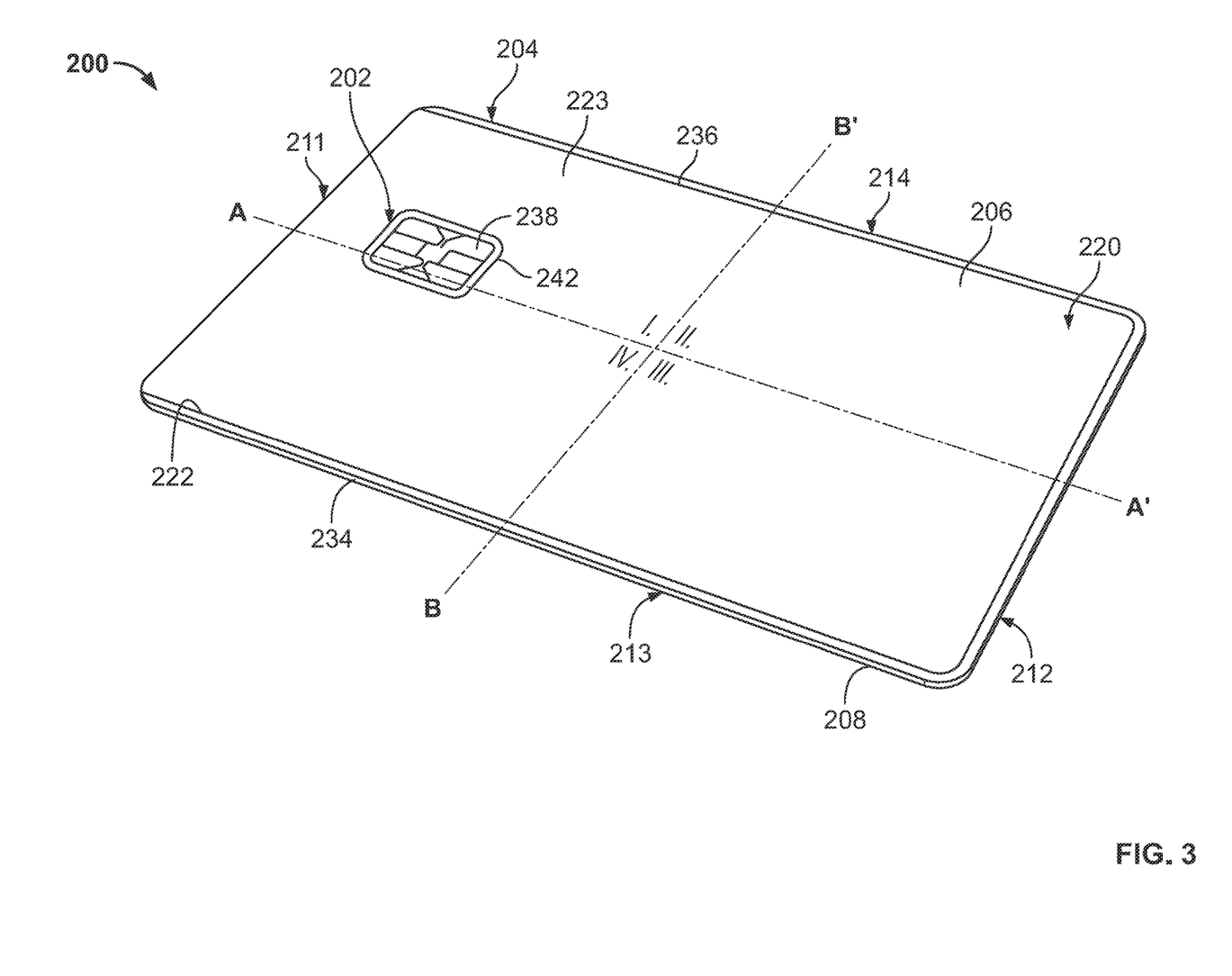
FIG. 3 is a perspective view illustrating a transaction card, in accordance with embodiments of the present disclosure.
Figure 4:
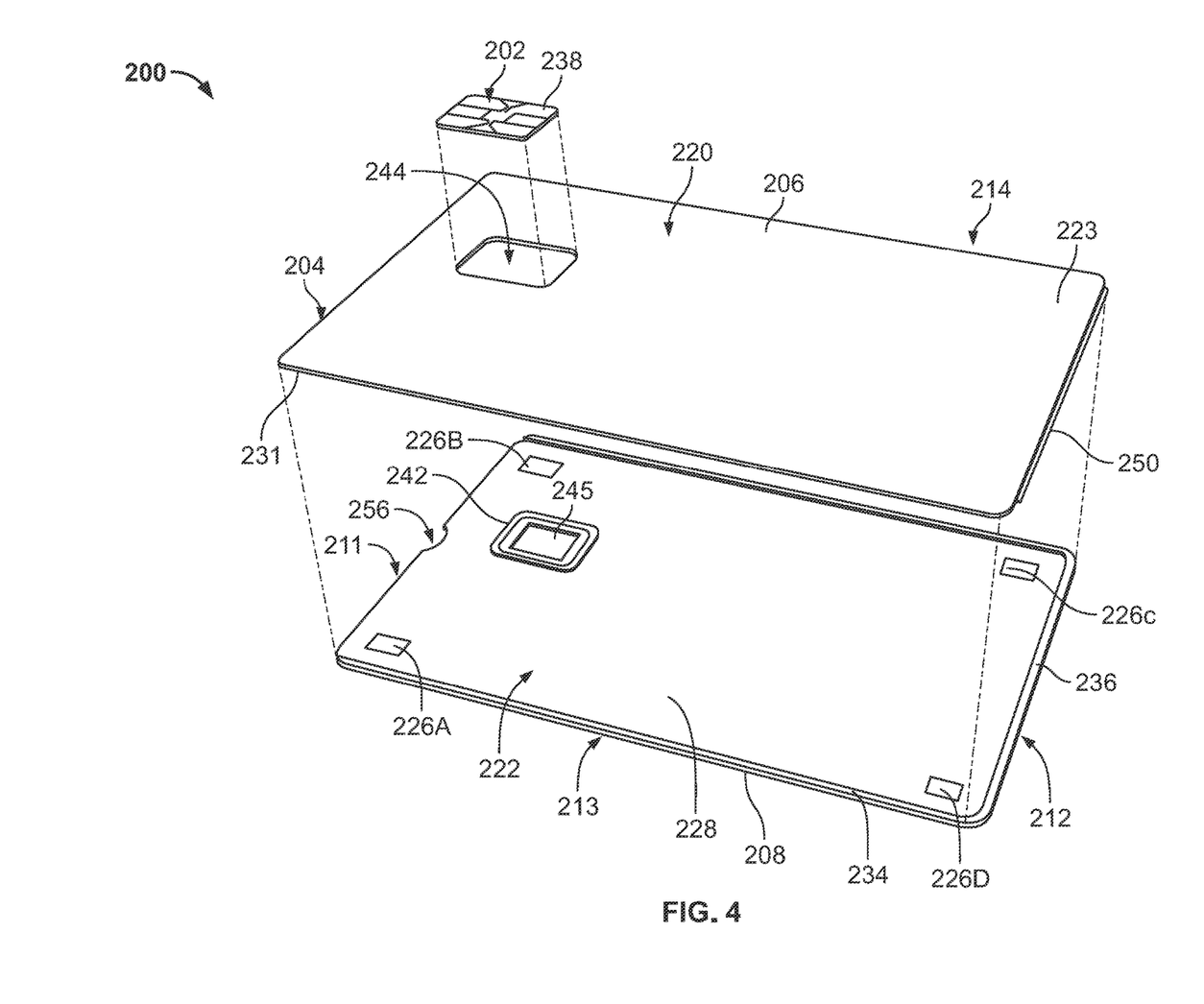
FIG. 4 is an exploded perspective view of the transaction card and an insert, in accordance with embodiments of the present disclosure.
Figure 5:
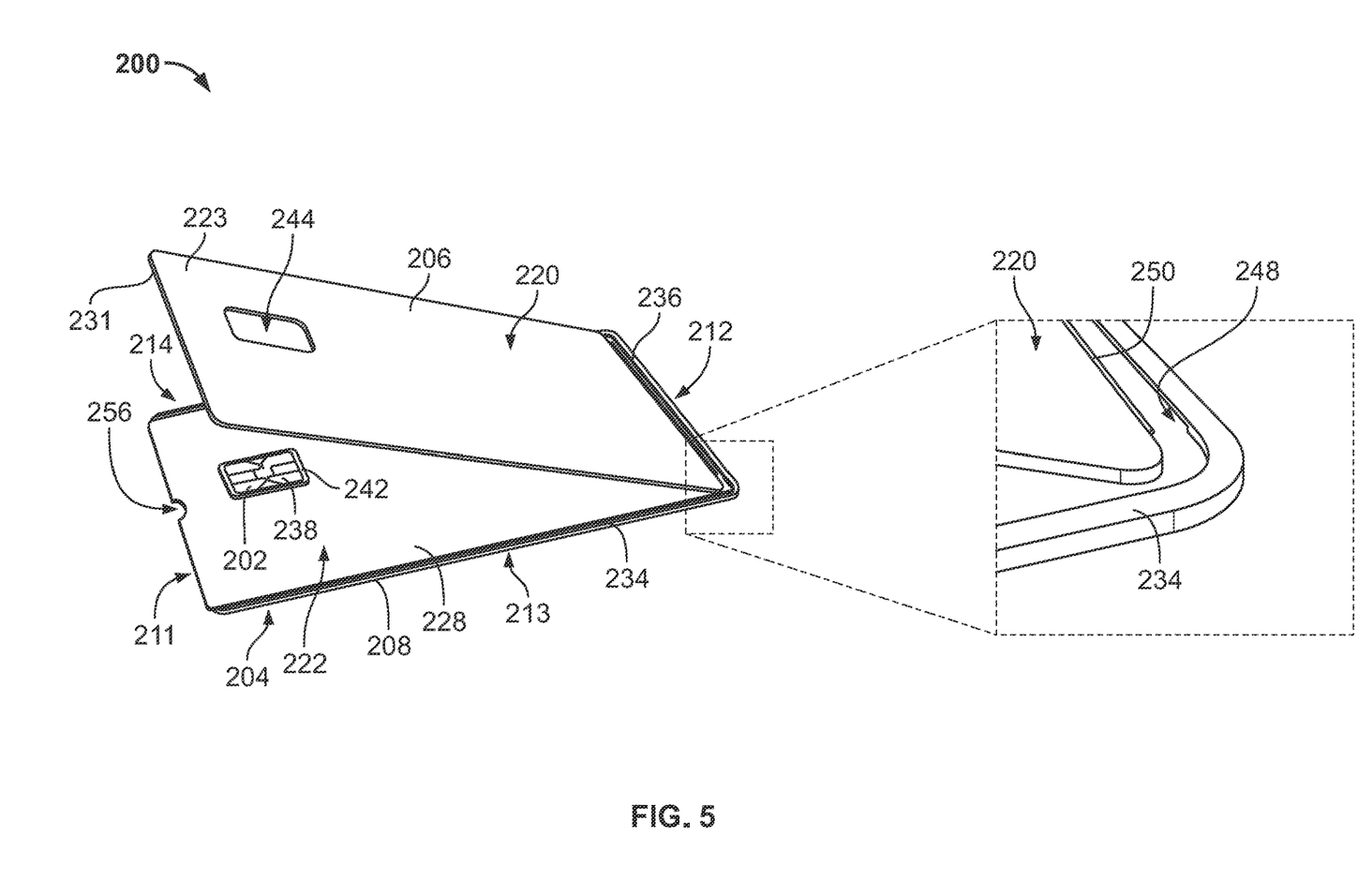
FIG. 5 is a perspective view of the transaction card and the insert during assembly, in accordance with embodiments of the present disclosure.

FIGS. 3-5 depict another example transaction card (hereinafter "card") 200 according to embodiments of the disclosure will be described. The card 200 may include a body 204 having a first main side 206 opposite a second main side 208. Although non-limiting, the first main side 206 may correspond to a front or top side of the card 200, while the second main side 208 may correspond to a back or bottom side of the card 200. The body 204 may further include a first end 211 opposite a second end 212, and a first side 213 opposite a second side 214. As shown in FIG. 3, the body 204 may be further defined by a first axis A-A' extending between the first end 211 and the second end 212, and a second axis B-B' extending between the first side 213 and the second side 214. The first axis and the second axis may extend generally perpendicular to one another, defining quadrants I-IV of the body 204.

The card 200 may further include an insert 220 along the first main side 206 and/or the second main side 208 of the body 204. In the embodiment shown, the insert 220 may be positioned within a recess 222 along the first main side 206 of the card 200. The recess 222 may be defined in part by an outer perimeter frame 234 extending around the body 204. In some embodiments, a plane defined by an upper surface 223 of the insert 220 may be generally co-planar with a plane defined by an upper surface 236 of the outer perimeter frame 234 and with an upper surface 238 of a chip 202. Although not limited to any specific shape or configuration, the insert 220 may extend entirely across the first main side 206 of the body 204, between the first end 211 and the second end 212, and between the first side 213 and the second side 214. Said another way, the insert 220 may extend across the first axis and the second axis and may be present within each of quadrants I-IV.

In some embodiments, the upper surface 223 of the insert 220 may containing identifying indicia (not shown), such as an account or card number, or user name. Although non-limiting, the card number may be a 16-digit number (e.g., four groups of four digits). In other embodiments, the card number may include a different number of digits. The identifying indicia may be printed over/on the insert 220. However, one skilled in the art will appreciate that the printing of the identifying indicia, along with any other indicia, logos, etc., may be applied to any surface or layer of the card 200. Moreover, any suitable printing, scoring, imprinting, marking or like method is within the scope of the present disclosure.

In some embodiments, the body 204 may further include an inner chip frame 242 having a second recess 245 (FIG. 4) to house the chip 202, wherein the inner chip frame 242 may extend away from an upper surface 228 of the recess 222. The chip 202 may be secured within the second recess 245 by an adhesive. When the insert 220 is positioned within the recess 222, the inner chip frame 242 and the chip 202 may extend through an opening 244 of the insert 220. In some embodiments, the inner chip frame 242 may include a fastener (e.g., snap fit tab or ridge along an outer surface of the inner chip frame 242) operable to engage a perimeter of the opening 244 to couple the insert 220 to the body 204. In yet other embodiments, the chip 202 may be coupled directly to the insert 220. As best shown in FIG. 5, in some embodiments, the outer perimeter frame 234 may have a cavity 248, which receives a protrusion 250 of the insert 220 when the insert 220 is positioned within the recess 222. At the first end 211 of the body 204 may be a notch 256, which permits easier access to the insert 220 during removal.

In some embodiments, the body 204 and the insert 220 may be the same material. In other embodiments, the body 204 and the insert 220 may be different materials. For example, the body 204 may be made from PVC while the insert 220 may be made from metal, fabric, natural or synthetic hair, wood, polyester, polycarbonate, or a combination of materials.

As best shown in FIGS. 4-5, the insert 220 is removable from the body 204 to enable replacement and customization of the card 200. In some embodiments, the insert 220 may be held in place by one or more magnets along the recess 222 and/or the insert 220. For example, the recess 222 may include a plurality of magnets 226A-226D (FIG. 4) spaced apart from one another within the recess 222. Although non-limiting, magnets 226A and 226B may be positioned proximate the first end 211, while magnets 226C and 226D may be positioned proximate the second end 212. It will be appreciated that a greater or lesser number of magnets may be present within the recess 222 in other embodiments.

In some embodiments, the plurality of magnets 226A-226D may be positioned atop, or extend through, the upper surface 228 of the recess 222. In other embodiments, the plurality of magnets 226A-226D may be embedded beneath the upper surface 228 of the recess 222. Alternatively, the upper surface 228 may be composed entirely of a magnetic material. In still other embodiments, an insulating layer (not shown) may be positioned between the plurality of magnets 226A-226D and the second main side 208 of the body 204 to prevent interference with the magnetic stripe along the second main side 208.

Although not shown, the insert 220 may also include magnets along a lower surface 231 thereof for engagement with the plurality of magnets 226A-226D. In other embodiments, the lower surface 231, or the entire insert 220, may be made from a magnetic material, such as a ferromagnetic metal. During use, the insert 220 may be held in position within the recess 222 by the attraction between the plurality of magnets 226A-226D and the magnetic material of the insert 220. In yet other embodiments, the insert 220 may be coupled to the body 204 using only the inner chip frame 242 and the protrusion 250 within the cavity 248, without the use of any magnets. Advantageously, the insert 220 may be removed and replaced with an alternative insert, which may include a different color, design, material, etc., as desired.

Figure 6:
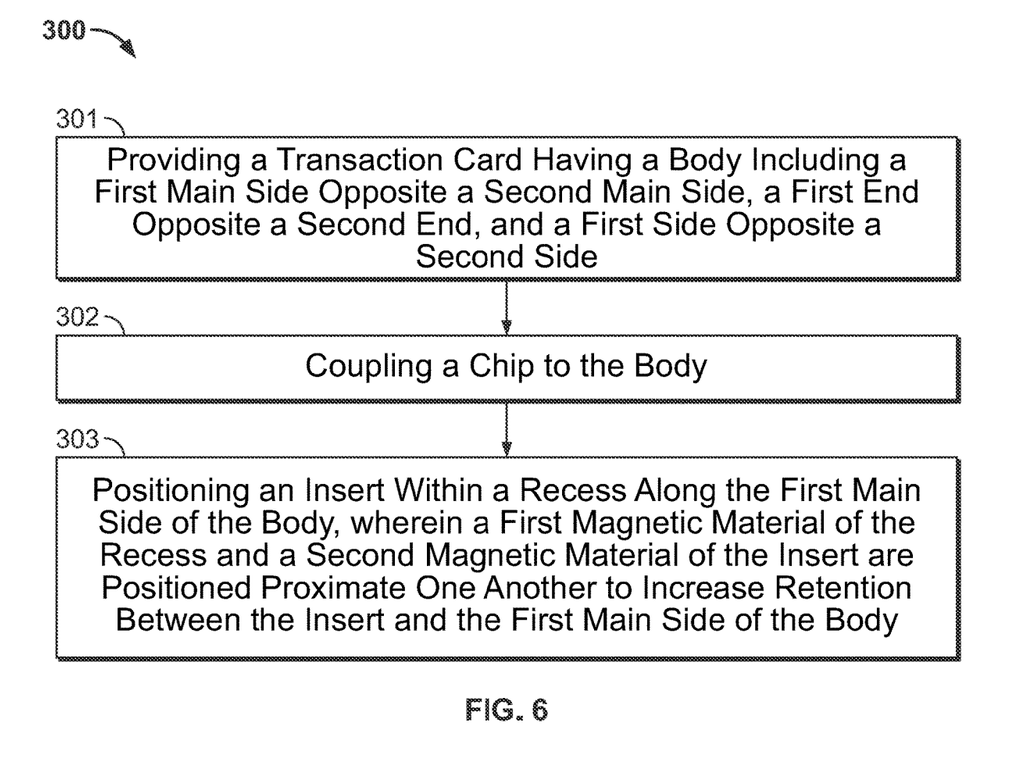
FIG. 6 illustrates a flowchart for performing methods in accordance with embodiments of the present disclosure.

Turning now to FIG. 6, a method 300 according to embodiments of the disclosure will be described in greater detail. At block 301, the method 300 may include providing a transaction card having a body including a first main side opposite a second main side, a first end opposite a second end, and a first side opposite a second side. In some embodiments, the transaction card may be a credit or debit card, a RFID passport, or an access card.

At block 302, the method 300 may include coupling a chip to the body. In some embodiments, the body may further include an inner chip frame having a recess to house the chip. The chip may be secured within the recess by an adhesive.

At block 303, the method 300 may include positioning an insert within a recess along the first main side. A first magnetic material of the recess and a second magnetic material of the insert may be positioned proximate one another to increase retention between the insert and the first main side of the body. In some embodiments, the insert may be further coupled to the body using the inner chip frame and/or a protrusion of the insert, which is retained within a cavity along a perimeter of the body. The chip and the inner chip frame may extend through an opening of the insert. When the cavity is present, the insert may be first inserted into the cavity and then rotated or lowered onto the body until the chip and the inner chip frame extend through an opening of the insert.

In some embodiments, the method 300 may further include decoupling the insert from the body to customize or replace the insert, as desired. In some embodiments, the body of the card may include a notch, which permits easier access to the insert during removal.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The term "adhesive" used herein may refer to any type of substance used for sticking objects or materials together and may be classified in a variety of ways depending on their chemistries (e.g., epoxies, polyurethanes, polyimides), their form (e.g., paste, liquid, film, pellets, tape), their type (e.g., hot melt, reactive hot melt, thermosetting, pressure sensitive, contact, etc.), or their load carrying capability (structural, semi-structural, or non-structural).

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Although non-limiting, the card 100 and the card 200 described herein may have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, although the illustrative method 300 is described above as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the method 300 may be implemented in association with the formation and/or processing of structures illustrated and described herein as well as in association with other structures not illustrated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A transaction card, comprising:
a body comprising a first main side opposite a second main side, a first end opposite a second end, and a first side opposite a second side, wherein a chip is coupled to the first main side of the body; and
an insert positioned within a recess along the first main side, wherein a first magnetic material of the recess and a second magnetic material of the insert are positioned proximate one another to increase retention between the insert and the body.

2. The transaction card of claim 1, wherein the body comprises:
a first axis extending between the first end and the second end; and
a second axis extending between the first side and the second side, wherein the first axis and the second axis are perpendicular to one another, and wherein the insert extends across the first axis and the second axis.

3. The transaction card of claim 1, wherein the recess extends between the first end and the second end, and between the first side and the second side.

4. The transaction card of claim 1, wherein the first magnetic material comprises a plurality of magnets positioned with the recess.

5. The transaction card of claim 1, further comprising an opening through the insert, wherein the chip extends through the opening.

6. The transaction card of claim 1, wherein the body further comprises an outer perimeter frame, wherein the outer perimeter frame has a cavity operable to receive a protrusion of the insert.

7. The transaction card of claim 1, further comprising an inner chip frame, wherein the inner chip frame defines a second recess along the first main side, and wherein the second recess is operable to receive the chip.

8. The transaction card of claim 7, wherein the insert is coupled to the inner chip frame.

9. The transaction card of claim 1, wherein the body is a first material, and wherein the insert is a second material different than the first material.

10. A transaction card, comprising:
- a body comprising an outer perimeter and a first main side opposite a second main side, wherein a chip is coupled to the first main side of the body; and
- an insert formed within a recess along the first main side, wherein the insert extends to the outer perimeter, and wherein a first magnetic material of the recess and a second magnetic material of the insert are positioned proximate one another to increase retention between the insert and the first main side of the body.

11. The transaction card of claim 10, wherein the body comprises:
- a first axis extending between a first end and a second end of the body; and
- a second axis extending between a first side and a second side of the body, wherein the first axis and the second axis are perpendicular to one another, and wherein the insert extends across the first axis and the second axis.

12. The transaction card of claim 10, wherein the recess extends between a first end and a second end of the body, and between a first side and a second side of the body.

13. The transaction card of claim 10, wherein the first magnetic material comprises a plurality of magnets positioned with the recess.

14. The transaction card of claim 10, further comprising an opening through the insert, wherein the chip extends through the opening.

15. The transaction card of claim 10, wherein the body further comprises an outer perimeter frame, wherein the outer perimeter frame has notch operable to receive a protrusion of the insert.

16. The transaction card of claim 10, further comprising an inner chip frame, wherein the inner chip frame defines a second recess along the first main side, and wherein the second recess receives the chip.

17. A transaction card, comprising:
- a body comprising a first main side opposite a second main side, a first end opposite a second end, and a first side opposite a second side, wherein an identification (ID) chip is coupled to the first main side, and wherein a recess is formed in the first main side; and
- an insert positioned within the recess, wherein a plane defined by a top surface of the insert is coplanar with a plane defined by a top surface of the first main side, and wherein a first magnetic material of the recess and a second magnetic material of the insert are positioned proximate one another to increase engagement between the insert and the body.

18. The transaction card of claim 17, wherein the body comprises:
- a first axis extending between the first end and the second end; and
- a second axis extending between the first side and the second side, wherein the first axis and the second axis are perpendicular to one another, wherein the first axis and the second axis divide the body into quadrants, and wherein the insert extends across the first axis and the second axis.

19. The transaction card of claim 17, wherein the insert extends to at least one of the first end, the second end, the first side, or the second side, and wherein the first magnetic material comprises a plurality of magnets positioned with the recess.

20. The transaction card of claim 17, further comprising an opening through the insert, wherein the chip extends through the opening.

* * * * *